(12) United States Patent
Thompson et al.

(10) Patent No.: US 6,925,473 B2
(45) Date of Patent: Aug. 2, 2005

(54) STAGED STYLIZATION IN MULTIPLE TIERS

(75) Inventors: Daniel Lee Thompson, Austin, TX (US); Natarajan Srinivasan, Fremont, CA (US)

(73) Assignee: Autodesk, Inc., San Rafael, CA (US)

(*) Notice: Subject to any disclaimer, the term of this patent is extended or adjusted under 35 U.S.C. 154(b) by 458 days.

(21) Appl. No.: 09/939,847

(22) Filed: Aug. 27, 2001

(65) Prior Publication Data

US 2003/0041070 A1 Feb. 27, 2003

(51) Int. Cl.$^7$ .............................. G06F 7/00; G06F 17/30
(52) U.S. Cl. .................................... 707/104.1; 707/10
(58) Field of Search .............................. 707/10, 104.1, 707/100, 101, 102; 345/419, 763; 709/203; 717/116, 143; 349/96; 235/472.01

(56) References Cited

U.S. PATENT DOCUMENTS

| | | | |
|---|---|---|---|
| 5,982,399 A | | 11/1999 | Scully et al. |
| 6,011,905 A | | 1/2000 | Huttenlocher et al. |
| 6,446,256 B1 | * | 9/2002 | Hyman et al. ............... 717/143 |
| 6,591,272 B1 | * | 7/2003 | Williams .................... 707/102 |
| 6,643,652 B2 | * | 11/2003 | Helgeson et al. ............. 707/10 |

* cited by examiner

*Primary Examiner*—Uyen Le
*Assistant Examiner*—Te Yu Chen
(74) *Attorney, Agent, or Firm*—Gates & Cooper LLP

(57) ABSTRACT

One or more embodiments of the invention provide a computer-implemented method for stylizing data into a presentation. A domain/data object is obtained that comprises an object representation of data stored in a database for a domain entity. An application object is then obtained that comprises an object representation of the data in the domain object that is relevant for a particular computer application. Lastly, a presentation object is obtained that comprises an object representation that encapsulates a visual appearance of the data in the application object.

36 Claims, 7 Drawing Sheets

STAGED STYLIZATION IN MULTIPLE TIERS

CROSS-REFERENCE TO RELATED APPLICATIONS

This application is related to the following co-pending and commonly-assigned patent application, which application is incorporated by reference herein:

U.S. patent application Ser. No. 08/826,339, entitled "IMMEDIATE MODE DRAWING INTERFACE FOR THE CONSTRUCTION OF GRAPHICS SOFTWARE", by Robert T. Scully et. al., filed on Mar. 26, 1997, now U.S. Pat. No. 5,982,399 issued on Nov. 9, 1999, which patent is a continuation-in-part of U.S. patent application Ser. No. 08/667,614, entitled "IMMEDIATE MODE DRAWING INTERFACE FOR THE CONSTRUCTION OF GRAPHICS SOFTWARE", by Matthew R. Arrott, et. al., filed on Jun. 21, 1996, which application is a file wrapper continuation application Ser. No. 08/970,959, filed Nov. 14, 1997, now U.S. Pat. No. 5,990,911 issued on Nov. 23, 1999.

BACKGROUND OF THE INVENTION

1. Field of the Invention

The present invention relates generally to graphics software, and in particular, to a method, apparatus, and article of manufacture for converting data from a database to a final presentation format.

2. Description of the Related Art

Computer-implemented graphics systems have been widely used by designers, illustrators, drafters, and engineers for a number of years to display and present information such as text and images to a user. For example, in the architectural, engineering, and construction (AEC) field, computer aided design (CAD) software may be utilized to assist architects, engineers, and contractors in designing a building, home, office, etc.

In graphics systems, objects such as doors, walls, windows, beams, joists, etc. may be selected and displayed by a user. Such objects persist within a database in the form of data (referred to as raw, pure, or abstract data). In the design process, such data is not the same as the presentation of that data.

For example, a door entity may be presented to a user as geometry representing a plan view or as some other geometry representing an elevation view in a graphical application or as text in a bill-of-materials application. Thus, although a door may be presented as a collection of lines on a video screen or on paper, the door object may also contain attributes, such as price, material, part number, vendor, etc., as well as spatial properties like location, extents, orientation, etc.

Another example is height data for terrain maps that may be presented to a user as a collection of nested contour lines (i.e., elevation lines) or as a collection of connected three-dimensional (3D) triangles. However, the height data may not be persisted as the lines or triangles. Instead, the height data may comprise a collection of (x,y) locations.

Thus, a given piece of data can be visualized in different ways depending on the application's requirements. Stylization is the process by which data is transformed from its pure/raw data form to the final presentation as desired by the application. Traditionally, this process has been a monolithic process or has been broken into fixed steps and assigned to specific locations in a tiered client-server environment. Such an approach lacks the flexibility to solve various client-server problems in an efficient manner.

One problem with the prior art is to efficiently support a diverse set of clients, from very thick to very thin while being able to reuse code between them. Take the example of a door that is being viewed by three different types of clients. Client A is very powerful and can be told about the door in the abstract terms of the original data and then generate presentations on the fly. Client B is less powerful and can only deal with managing a list of graphics primitives and must rely on the middle tier to perform the stylization of data to these graphic primitives. Client C is even less powerful and can only display bitmaps and must rely on the middle tier(s) to provide the stylization from data to bitmap. With monolithic stylization or smaller steps in fixed locations, these three paths from data to presentation can share no code.

Another problem is reproducing the stylization output at diverse destinations. If Client A, from above, wanted the middle tier to output its view of the data's presentation to a printer (e.g., a large E-sized plotter), it would either have to send its presentation back up to the middle tier and over to the print server or rely on code in the middle tier or on the print server to duplicate the stylization process of the data. The first option has severe performance problems in using bandwidth, and the second option is very likely to introduce inconsistencies in the two presentations.

A third problem is the mixing of types of presentations. Going back to the example of height data for a piece of geography, imagine a client that wants to present the data as a course triangle mesh (for viewing from some angle other than above) but with the 10 foot contour lines as polylines to allow snapping or some other interactive use. Additionally, the client wants to use the 1-foot contour lines or alternatively some satellite images to create pixel textures for the triangles. With a monolithic stylization approach, such merging of data could be difficult and would most likely duplicate the code of creating the various contour lines.

SUMMARY OF THE INVENTION

To view objects and elements in a drawing, abstract data (e.g., a database record noting that a particular type of door exists within a particular wall at a particular place) is transformed to create a final presentation that provides for the visual appearance of the data (e.g., graphics, text, images, etc.) as desired by an application. This transformation process is referred to as stylization.

In one or more embodiments of the invention, the process of stylization is broken up into multiple steps. By breaking up the stylization process, the transformation may be spread across multiple computers or tiers in a client-server environment. Accordingly, various stylization steps may be performed by one or more computers in a client-server environment (e.g., an original data server, a middle tier computer, and/or a client's computer).

The results of one or more stylization steps may be cached depending on the needs of the system. Additionally, the stylization steps may be portable. Some advantages to portability may include the ability for the stylization steps to be placed across the tiers, thereby allowing the stylization steps to balance the task between tiers of varying computing power and bandwidth constraints. Additionally, the portability may allow the stylization path to branch towards different destinations or to allow multiple stylization steps to converge.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Stylization of data is broken up into any number of steps with optional caching before and after a step. The stylization may be allowed to arbitrarily move up and down across tier boundaries and feed multiple other steps or be fed by multiple stylizer steps.

Hardware Environment

Figure 1:
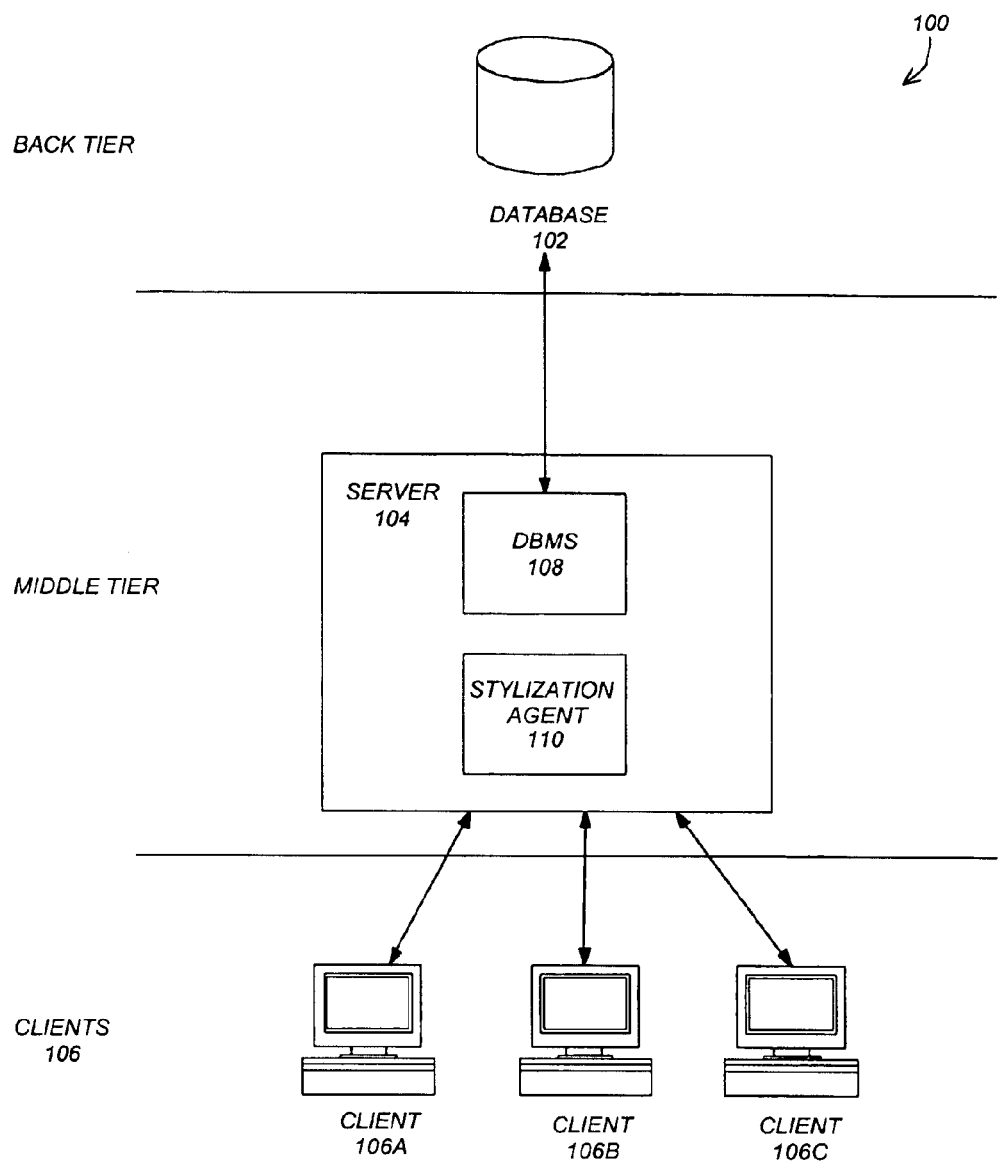
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical computer system 100 wherein clients 106 (comprised of one or more client computers 106A–106C) are connected to one or more server computers 104. Such computers may be connected across a network comprising the Internet, LANs, WANs, or the like. Clients 106 may comprise personal computers, workstations, handheld personal computers (HPC), palm-held personal computers (PPC or PDA), and/or smart phones, and servers 104 may comprise personal computers, workstations, minicomputers, mainframes, or handheld computer devices.

Clients 106 may execute a client application and communicate with server computers 106 to coordinate and distribute functionality between a client 106 and a server 104. Server 104 may be viewed as a middle tier and may provide varying levels of functionality depending on the capabilities of clients 106. For example, for a very thin client 106 (e.g., a handheld computing device), server 104 may provide significant functionality that provides a presentation object to client 106. However, if client 106 is a little thicker, less functionality may be provided by server 104. Further, if client 106 is powerful, little or no functionality may be provided by server 104. Server 104 may also provide logic to manipulate data stored in a database 102 (the back tier) through a database management system DBMS) 108. Alternatively, database 102 may be part of or connected directly to client 106 instead of communicating/obtaining the information from database 102 through server 104.

Additionally, as described in detail below, server 104 may include one or more stylization agents 110 that provide the ability to stylize data from database 102 into visually acceptable data viewed by clients 106.

Generally, these components 102–110 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed. It should be noted that the stylization agents 110 and DBMS 108 may not be located entirely within a single server 104. Instead, or in addition to one server 104, the functionality provided by stylization agents 110 and DBMS 108 may be present and/or distributed among one or more clients 106 and one or more servers 104.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Details of Software Embodiments

Stylization is comprised of multiple stages or steps. Data that is persisted in the database 102 may serve the needs of multiple applications. Thus, a given door entity may not only contain information such as physical location and size that are important for graphical applications but also information such as the supplier of that door, date that door was installed and the cost of all the materials used in that door, i.e. information important to other applications. A given application will however only consume the subset of information that it needs. If stylization were designed to be a single-step process, it would not have scalability because this step would have to be repeated in full for every application and even for different instances of a given type of application. Breaking stylization into multiple stages, caching results at each stage and reusing them makes it more scalable. There are two broad stages and three object models that serve as the end points in the stylization process.

In the domain object model, domain objects are typically the object representations of the data in the database 102; thus these objects may contain all of the information about the domain entities they represent. The type of domain entity may vary. For example, embodiments of the invention may be utilized in a mechanical domain entity, an architecture, engineering, and construction (AEC) domain entity, or in a geographic information system (GIS) domain entity. In a further example of different domain entities, an electric motor may store properties that are relevant in the AEC domain as well as properties that are relevant in the mechanical domain. However, the domain object for the electric motor in the AEC domain may only deal with the AEC properties while the domain object for the mechanical domain may only deal with the mechanical properties. Domain objects may be used in any application that is designed for that domain. Thus, the electric motor domain object in the AEC domain can be used in AEC space planning application as well as the AEC cost estimation application and so on.

In the application object model, application objects are application-specific specializations of domain objects. Thus, application objects may only contain information that is relevant to a particular application. Application objects may also implement the business logic that provides that application's functionality. Accordingly, an AEC space planning application may have its own type for an electric motor, and so will an AEC cost estimation application. However, both of these application types will share the same electric motor AEC domain object.

In the presentation object model, presentation objects encapsulate the visual appearance of the data. These objects could be simple graphical primitives or complex graphical objects or primitives of other types such as HTML codes/elements.

A first stage of stylization may transform domain objects to application objects and the second stage may transform application objects to presentation objects. While most projects fit nicely into these three models, the stylization design in accordance with embodiments of the invention does not limit the developer to only three models.

The stylization framework deals with four important elements: data objects, a stylization context, stylization agents, and the stylization framework itself. The data objects are from the object models described above (and may comprise either domain objects or application objects as described in detail below), and the context, agents, and framework will be described below.

Embodiments of the invention provide the ability to generate multiple presentations for a single object. This ability must be balanced with various desirable options such as allowing third parties or users to edit an existing presentation or add a new presentation, and providing a third party or user with the ability to make objects present themselves as the third party or user desires (e.g., "we want our doors to look different than what came in the box").

Being able to add a presentation means different things in different object models. Data objects may comprise either a domain object or application object. In other words, a data object may be selected from the group comprising a data object or application group. At the domain object model, adding a presentation is a way to stylize into a different application object model. When adding a new application, the ability to stylize the domain object into an application object may be a requirement. At the application object model, adding a presentation is equivalent to adding a logical view, such as adding elevation view to plan view in an architectural application. It would be nice to think that when designing an application, every appropriate logical view will have been created, but experience has shown that customers and third parties will usually think of something extra or new.

Numerous disadvantages may result depending on how such presentation generation is implemented. If code for generating each presentation is stored with each object, the code for every possible presentation is loaded, even if only one presentation is being used, thereby impacting the performance of stylization. Accordingly, the approach of one-object-method-per presentation may not accommodate the desirable options as described above.

One or more embodiments of the invention provide one method for each object (and not each presentation) that takes a parameter to identify which presentation is desired. This parameter may identify which presentation is desired, though it can also contain other contextual and state information. This parameter is referred to as a "stylization context".

An example declaration for a class in accordance with one or more embodiments of the invention is:

Class AECObject
{
    Public stylize (StylizationContext context) {}
}

Thus, as described, a stylize method accepts a stylization context as input and provides for stylizing an instance of the AECObject into the stylization context specified.

To allow for the addition of extra presentations (via new context identifications) or changing a presentation result for an already known presentation object, the stylize method may be broken out into an independent object (referred to as a stylization object or stylization agent 110). Since such a stylization agent object 110 is separated from the object to be stylized, a stylize method likely has the data object passed to it and all of the data of the object is likely accessible through public methods. Further, since the stylization context could be providing state information, the stylize method may also take the context as a parameter. An example class declaration for a stylization agent 110 is:

Class StylizationAgent
{
    Public stylize (DataObject object,
        StylizationContext context) {}
}

Figure 2A:
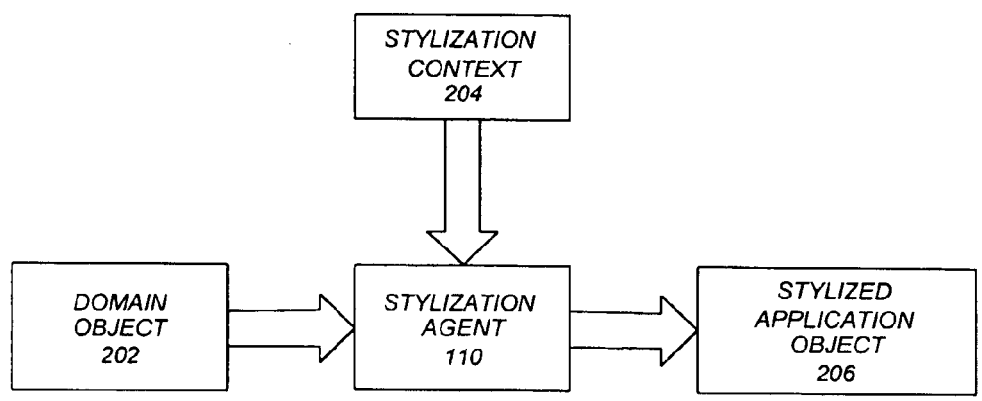
FIGS. 2A and 2B illustrate the use of a stylization agent in accordance with one or more embodiments of the invention.
Figure 2B:
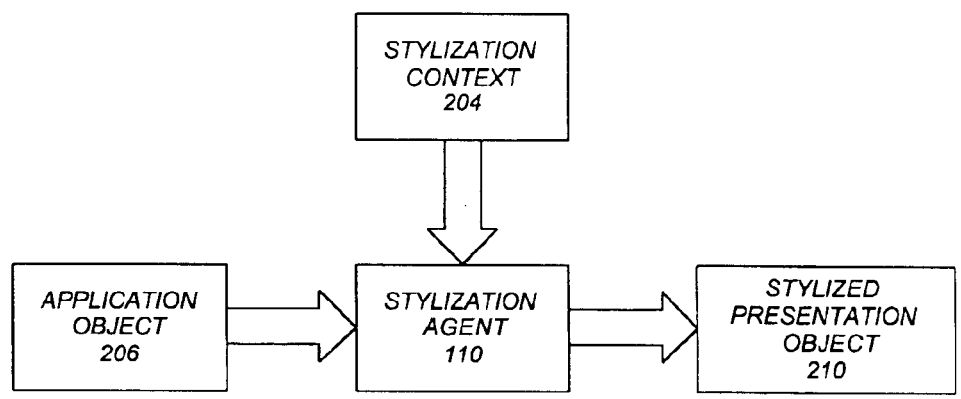

FIGS. 2A and 2B illustrate the use of a stylization agent 110 in accordance with one or more embodiments of the invention. A domain object 202 and stylization context 204 are passed as parameters to stylization agent 110 in FIG. 2A. Stylization agent 110 uses a stylize method to provide stylized application object 206 as output. As illustrated in FIG. 2B, the application object 206 may then be passed as a parameter with another stylization context 204 to a stylization agent 110 to provide a stylized presentation object 210.

Each data object (that may be either a domain object 202 or application object 206) may comprise a list of stylization context 204—stylization agent 110 pairs that provide enough information to choose the agent 110 appropriate for a given context 204.

By allowing stylization to be performed by stylization agents 110, code is only loaded upon demand for generating a particular application object 206 or presentation 210. Additionally, third parties can add new application objects 206 or presentations 210 by creating their own stylization agents 110 and the associated contexts 204. Further, third parties can change an existing application object 206 or presentation 210 by registering a different stylization agent 110.

A stylizer (also referred to as a stylization framework) provides a common framework for managing the stylization agents 110 that all object models can use. In the stylizer, there are data objects (e.g., domain objects 202 or application objects 206) (potentially stored in database 102 and controlled by DMBMS 108), stylization contexts 204, and stylization agents 110. Each performs the role described above. Data objects 202 and 206 hold the data. Stylization contexts 204 identify the application object 206 or presentation 210. Stylization agents 110 create the application object 206 or presentation 210.

The stylization agents 110 within the stylizer may be organized into a two-dimensional array, indexed first by the data object class 202 or 206 and then by the stylization context 204. The array may then be managed by methods of the stylizer. The following illustrates an example of such an array:

|  | Context 1 | Context 2 | Context 3 |
|---|---|---|---|
| Object A | ObjAContext1 | ObjAContext2 | ObjAContext3 |
| Object B | ObjBContext1 | ObjBContext2 | ObjBContext3 |
| Object C | ObjCContext1 | ObjCContext2 | ObjCContext3 |
| Object D | ObjDContext1 | ObjDContext2 | ObjDContext3 |

This array (or collection of lists) needs to be managed to handle the addition of data objects 202 and 206 and contexts 204 by third parties. The array management is a large responsibility if left to a developer/producer of an object model (since the basic problem is the same across all object models in all applications). Accordingly, the management of the agents 110 is extracted out of the object model into the stylizer that all object models can use.

An example of a class declaration for the stylizer is:

```
Class Stylizer
{
   Public registerDataObject (DataObject object) {}
   Public registerStylizationContext (StylizationContext
      context) {}
   Public registerAgent (DataObject object,
      StylizationContext context,
      StylizationAgent agent) {}
   Public stylize (DataObject object,
      StylizationContext context) {}
}
```

The three registration methods provide for registering a new data object 202 and 206, registering a new stylization context 204, and registering an agent 110 for a data object 202 and 206 and a stylization context 204. The three methods for registering objects and contexts 204 do not have to be done for each instance. Instead, they only have to be done once per class of data objects 202 and 206 and contexts 204 with the stylizer using static identifiers for each class. Subsequently, the stylizer maintains knowledge regarding data objects 202 and 206 of a particular class and contexts 204 of a particular class, and can map an agent 110 to a paired index of (object-class, context-class) via the registerAgent method. The stylize method may then use that mapping to find and invoke the appropriate agent 110.

By utilizing a stylizer as described above, four double de-references and two array bounds checks are executed. However, such execution does not involve any loops since all of the actions may be completed using indexed arrays. Accordingly, such embodiments provide flexibility without compromising memory and performance.

Figure 3:
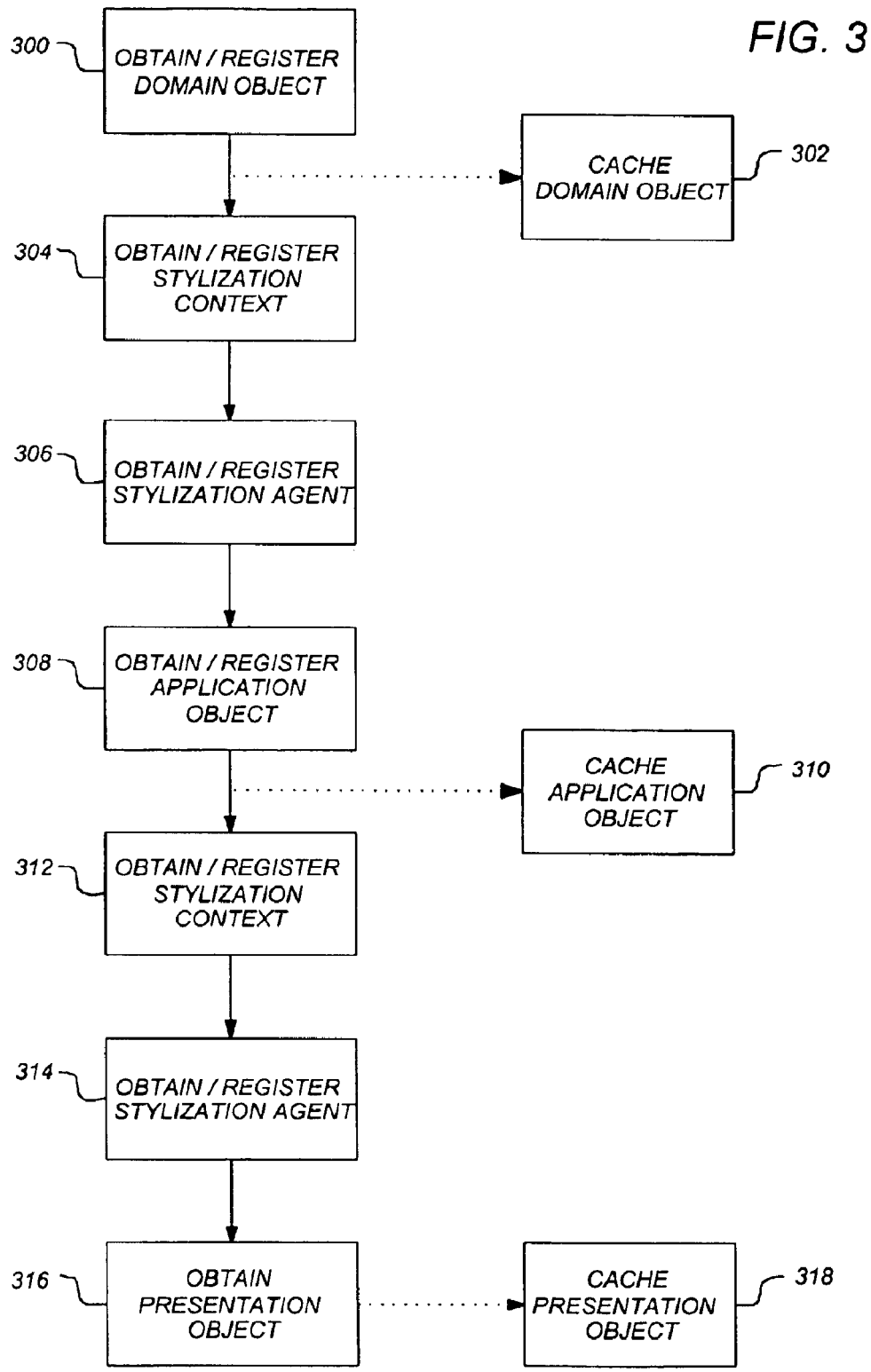
FIG. 3 is a flow chart illustrating stylizing in accordance with one or more embodiments of the invention.

FIG. 3 is a flow chart illustrating stylizing in accordance with one or more embodiments of the invention. At step 300, a domain object 202 comprising an object representation of data stored in a database 102 for a domain entity is obtained and registered (e.g., using the registration method in the stylizer class).

At step 302, the domain object 202 may optionally be cached. At step 304, a stylization context 204 that identifies an application specific representation for the data in the domain object 202 is obtained and/or registered. At step 306, a stylization agent 110 is obtained and/or registered. The registration of the stylization agent 110 may comprise creating a stylizer/stylization framework that maps the stylization agent 110 to a paired index of domain objects 202 and stylization context objects 204. As described above, the stylization agents 110 may be organized into a two-dimensional array indexed by a data object class 202 and 206 and stylization context 204.

At step 308, an application object 206 comprising an object representation of the data in the domain object 202 that is relevant for a particular computer application (and that may contain business logic that provides functionality for a particular application) is obtained and/or registered (e.g., using the stylization context 204 and stylization agent 110). The application object 206 may optionally be cached at step 310.

Similar to steps 304 and 306, at step 312, a stylization context 204 that identifies a visual appearance for the data in the application object 206 is obtained and/or registered. At step 314, a stylization agent 110 is obtained and/or registered. The registration of the stylization agent 110 may comprise registering the stylization agent 110 to a paired index of application objects 206 and stylization context objects 204. As described above, the stylization agents 110 may be organized into a two-dimensional array indexed by data object 202 and 206 and stylization context 204.

At step 316, a presentation object 210 comprising an object representation that encapsulates a visual appearance of the data in the application object 206 is obtained. To obtain the presentation object 210 at step 316, a stylize method that is part of the stylizer object/class may be utilized. As described above, the stylize method may have a data object (such as application object 206) and stylization context 204 as parameters. Thereafter, the stylize method uses the indexed array to determine the appropriate stylization agent 110 based on the data object 202 and 206 and stylization context 204 specified. The stylization agent 110 is then utilized to perform the desired stylization. At step 318, the presentation object 210 may optionally be cached.

Alternatively, an application object 206 may not be utilized to obtain the final presentation object 210. In such an embodiment, a domain object 202 may be used as a parameter to the stylization agent 110 to immediately produce a presentation object 210 thereby eliminating the intermediate step of producing an application object 206.

Figure 4:
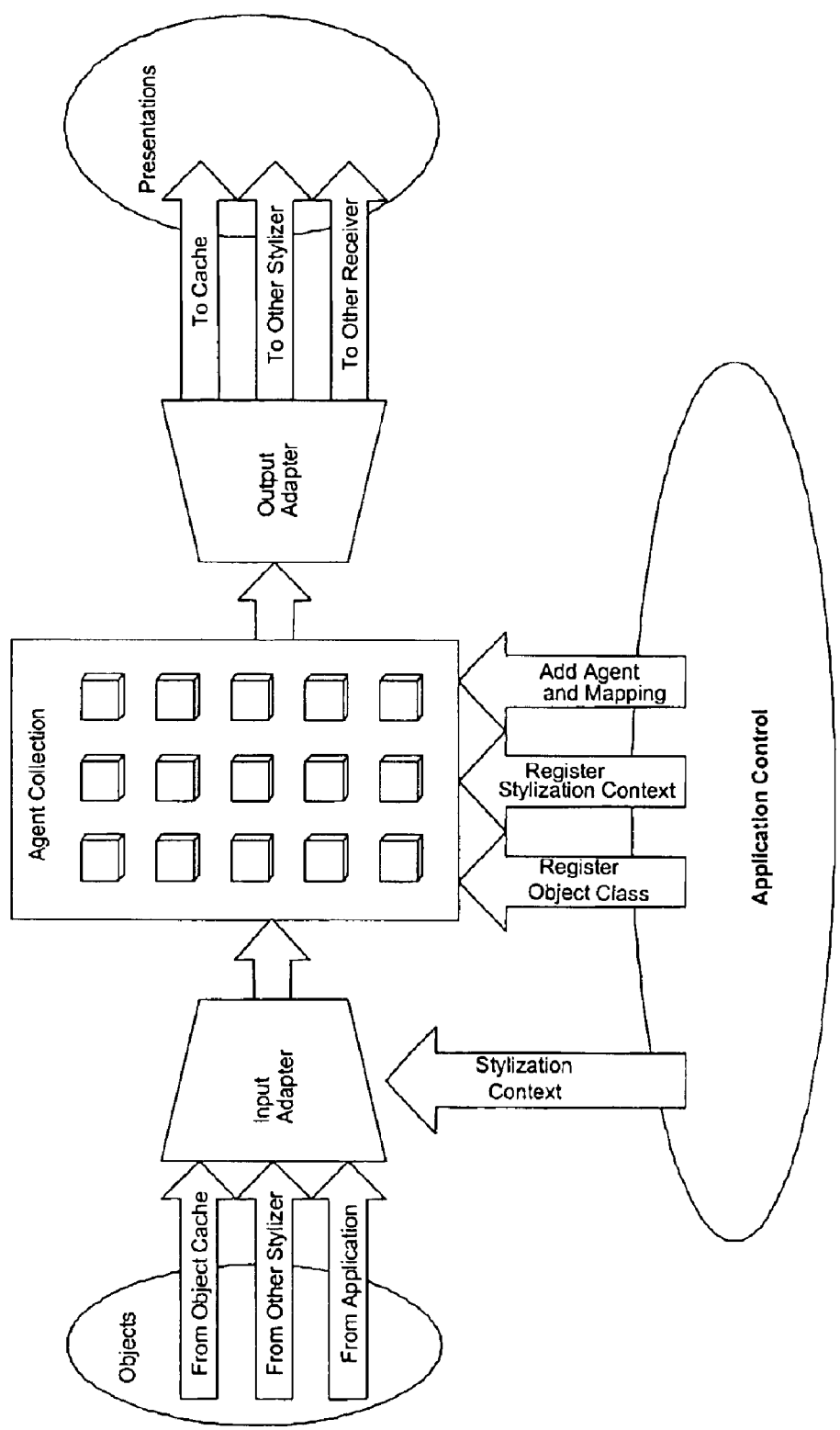
FIG. 4 illustrates the stylizer performing the steps of FIG. 5 in accordance with one or more embodiments of the invention.

FIG. 4 illustrates the stylizer performing the steps of FIG. 3 in accordance with one or more embodiments of the invention. In FIG. 4, a stylization context 204 and objects 202 are input from object cache, other stylizers, and applications into an input adapter. A collection of stylization agents 110 is established by the input adapter and application control that provides the various registration procedures (e.g., the register object 202 and 206 method, register stylization context 204 method, and add agent 110 (register agent 110) and mapping). The agent collection is then used by an output adapter to generate an application object 206 or presentation object 210 that is output to cache, another stylizer, or another receiver.

Additional Functionality and Options

Two elements on the fringe of the stylization process are caches and input/output adapters. Caching various object models for scalability may be one of the advantages of staged stylization. The caches' main roles in stylization are to save the results of stylization and to respond to queries for those results. These caches are often more a part of the object model than of the stylization process, but developers may need to be aware of them. Input and output adapters aid the flow of data through the stylization process. Such adapters may mask many of the implementation details of whether the input data came from a cache or directly from the output of another object model's stylization.

To aid developers, a stylization toolkit may be provided in accordance with one or more embodiments of the invention. This toolkit may include the stylizer, additional tools/APIs (application programming interface) for managing the stylizer, and collections of common components used in stylization such as input/output adapters, caches, and particularly, general-purpose stylization agents. An objective of such a toolkit may include minimizing the amount of work and skills required of an application developer.

Since an agent 110 may be plugged in anywhere in the object-context table of agents 110, developers may be able to employ significant code reuse and share agents 110 between objects 202 and contexts 204 where appropriate. Some of this reuse may be limited to a specific application. However, some kinds of agents 110 may be useful across many applications. Such useful agents 110 may be provided as part of the described toolkit. The following common agents 110 may be utilized and provided in accordance with one or more embodiments of the invention:

(1) XSLT wrapper: Since XSLT provides something similar to stylization from one XML schema to another, some developers may want to accomplish their stylization through XSLT. This agent 110 will provide access to XSLT services. A developer wanting to use XSLT for stylization can just register this agent 110 for the object(s) 202 and context(s) 204 in question and then move on to creating the XSL style-sheets.

(2) Table/DB lookup: In some cases, stylization is fairly symbolic, merely generating the proper symbols for a given object type. Often these symbols are stored in a table or external database 102, and accessed by a key value such as object type or part number. This symbolic representation is often scaled and oriented before being placed into the output object model. This agent 110, or perhaps several agents 110, will provide access to these data stores 102 and manage the query and the results. A developer wanting to use this type of stylization will just have to register the agent 110, specify some information about the data store 102 in the context 204, and move on to the creation of data for that data store 102.

(3) Default/fallback agents: These will come in a variety of types and can be used where a proper agent 110 was not created or specified. One example would be an agent 110 that queried the object for its extents and created a box for its presentation 210. Another might add attributes and orientation to the box. Another would query for a part number and pass it on as a string into a textual object model.

(4) Geometric translation: Some stylization steps may revolve around translating from one geometric representation to another, such as ACIS to tri-strips. These tasks can be done in standard agents 110.

In many applications, the application developer has intimate knowledge of an object model and hence is the best person to implement an optimized cache for the data in that model. However, generic caching mechanisms may be adequate in some cases. The toolkit may provide implementations of a few generic caches, allowing such features as spatial organization, logical groupings, and parent-child relationships.

Contexts 204 are by definition fairly application specific, but many contexts 204 will have things in common. For example, if XSLT wrapper agents will be used in a given context 204, the context 204 provides a reference to the desired XSL style-sheet(s). Likewise, in a context 204 where an external symbol database 102 is used, the context 204 provides a reference to that database 102. The toolkit may provide much of this functionality in various context 204 base classes. While base classes may not be fully functional contexts 204, they may provide much of the common machinery.

While working directly with the stylizer and agents 110 may be simple, such access may be rather repetitive in the code. To ease code repetitiveness, a set of tools and wrapper APIs may be provided to handle some/most of the management for the developer. In such an API, registering an agent 110 may become as simple as filling a table with text strings. Some of these tools may allow for validation of agents 110 at initialization time, ensuring that the agents 110 are a proper match for the input object 202 and the stylization context 204. Other tools may even allow for some automatic selection of default agents 110 for those table entries that are not specified.

When the toolkit is completed, an application developer should be able to focus mostly on the creation of the object models and business logic. Further, based on the described embodiments, the amount of stylization work will most likely be minimal. The contexts may require some additional work, and the developer may have to determine which of the agents 110 supplied by the toolkit are useful. For instance, a developer may find the XSLT-wrapper-agent or the symbol-table-lookup agent adequate; in that case, no custom agent 110 code needs to be written. Thus, a simple application may be strung together almost entirely of off-the-shelf components.

Fundamentally, stylization transforms data from one schema to another. As described, XSLT may be used in accordance with one or more embodiments of the invention. In XSLT, data transformation is performed via templates; templates specify rules that determine which XML-elements/data may be transformed by a given template. Thus, when an XML-element is to be transformed, the right template for that transformation is chosen by matching the element with template rules.

The description above illustrates the importance of allowing multiple presentations for a given piece of data. In XSLT, embodiments may write as many XSL style-sheets as there are presentations. Determining which style-sheet to employ at run-time may not be possible without the help of a context 204 that indicates which specific transformation is needed and a framework/stylizer that manages the contexts 204, data objects 202 and the mapping of an object-context pair to the corresponding style-sheet. Thus, in an XSLT environment, the stylization context 204 and stylizer may still be utilized in one form or another. Further, in an XSLT environment, a stylization agent 110 may comprise a wrapper for XSLT services (which may be part of a stylization toolkit).

As described, the second stage of stylization comprises transforming application objects 206 to presentation objects 210. Presentation objects 210 may comprise primitives such as text strings, images, lines, polygons etc. or complex graphical objects such as a 3D object or even a custom 2D object. In the case of primitives, no further stylization is necessary; a line is a line and it cannot be stylized further into some other representation. In other words, all stylizations are complete when the line is produced.

Accordingly, there may be a need to compute primitive objects based on complex objects. In one or more embodiments of the invention, primitive objects are computed dynamically from related complex objects. For example, a developer may execute event handlers in response to various events (like moving an object, resizing an object, etc.). The event handlers may be coded in Jscript or Java. The advantage of using events for this capability is that the author is able to control the circumstances that lead to executing the code. Another advantage of this approach is that things like bounding box and hit testing of dynamically computed geometry falls out for free, since the computed geometry is managed in exactly the same object model that static hierarchical geometry is managed. Since pure Java code may be executed in the event handler, there is no reason why stylization cannot be used in the event handler as well. Using stylization may be necessary in certain applications. It will be up to the application developer to decide whether the extensibility and flexibility of stylization is needed. For example, stylization may be used because the code lives in independent classes and can be reused in other objects/applications where applicable.

Thus, in one or more embodiments of the invention, stylization may be positioned as a mechanism that the developer of a complex object can use for dynamic computation of that complex object's display primitives.

When an edit occurs, the new data is eventually placed in the database 102 as a domain/data object model object and must then flow down through the application object model and presentation object model and across the middle server tier 104 to the client 106 tier. In one or more embodiments of the invention, a concept of delta stylization may be implemented. With delta stylization, the flow of information is optimized so that only the changes are stylized instead of entire objects.

Reverse Stylization

As described above, stylization is used as a mechanism for transforming data, as it flows down from the database 102, through the middle server tier 104, to the client 106. However, in the event that an application creates new data, an application object model (AOM) object will first be created. An AOM object is created to evaluate rules and constraints before proceeding to create the new data in the database 102. Accordingly, there may be a need for creating a domain/data object model (DOM) object from a given AOM object, i.e. transform data as it flows upward, through the middle server tier 104, to the database 102. Thus, stylization may also be referred to as the transformation of data in one form or representation to another form or representation. When the transformation of data is upward, the process is referred to as reverse stylization.

Reverse stylization is likely not applicable in the AOM-POM (presentation object model) stage of stylization. Such inapplicability results because at the POM level, the objects do not have any association with the real world entity they represent. In other words, it is difficult to associate presentation objects 210 such as lines with, for instance, the wall they may represent in a given application. Also, the AOM-POM stylization often generates multiple objects and supporting the reverse stylization of this kind of a transformation may create many levels of complexity. Accordingly, the following description describes reverse stylization in the context of the DOM-AOM stage of stylization. However, it should be noted that stylization at the AOM-POM stage may also be performed and is within the scope of the present invention.

A downward stylization may produce many types of mappings. For example, a 1-to-many mapping may be produced. Such downward stylizations (i.e., those that produce a 1-to-many mapping) may not be eligible for the reverse stylization process. However, downward stylizations that produce a 1-object-instance to 1-object-instance mapping, and not a 1-to-many mapping may be used for reverse stylization. Further, as for the properties of a given input object and output object are concerned, there is a 1-to-1 mapping or there could be derived properties, their derivation being characterized by no information loss. If there is information loss in the derivation, those properties will not be editable in an application, i.e. these properties cannot be reverse stylized.

Objects that are output objects in downward stylization can be registered with a stylizer similar to the way input objects do (thereby enabling the output objects to be reverse stylized). The agent 110 that contains the code for transforming an object in the downward flow may also include the code for the reverse stylization. The direction of stylization can be easily determined in the agent 110 by switching on the type of the object that is passed into the stylize method call.

A stylizer interface may also provide a registerAgent method that utilizes an additional parameter—a string that specifies the name of a public method in the agent 110 being registered. Using such a method, at run time, the stylizer may use the method name and a Java Reflection API to invoke the correct method in the agent class registered for a given <object type, context type> pair.

Accordingly, various embodiments may be utilized to provide for reverse stylization.

SPECIFIC EXAMPLES

The above details describe numerous embodiments for breaking up the stylization of data. The background described various problems that the invention overcomes. The examples below describe details of the use of the invention to overcome the example problems.

The first problem described moving the data of a door to three diverse clients 106. In the prior art, three distinct paths coded into three monolithic steps. Under the present invention, the task is broken up into three steps S1, S2, and S3. S1 turns the database 102 output into a door object. S2 turns the object into a list of graphical primitives. S3 turns the graphical primitives into a bitmap that is finally sent to an output device.

Figure 5:
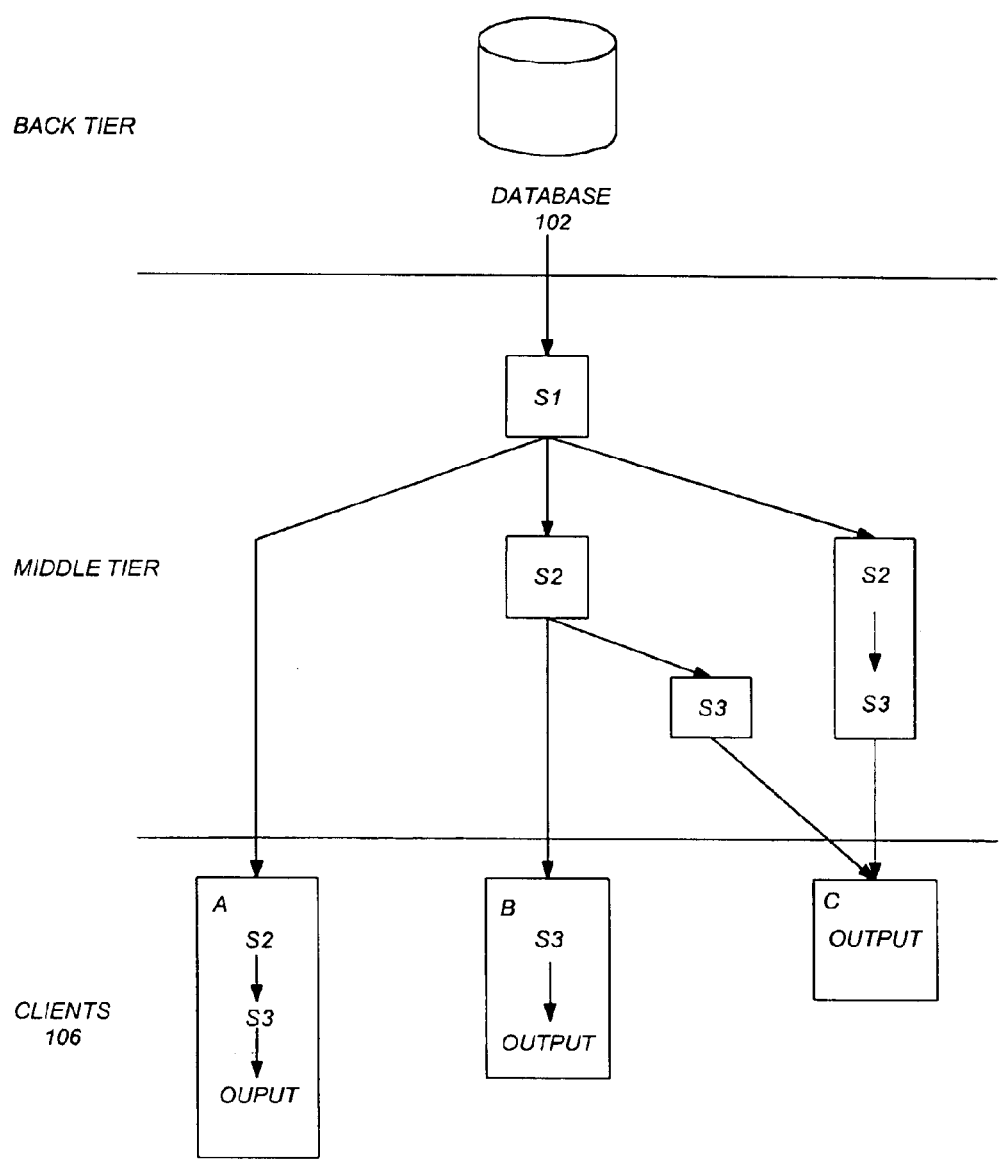
FIG. 5 illustrates a diagram of an example implementation in accordance with one or more embodiments of the invention.

FIG. 5 illustrates the different paths now possible. The boxes in FIG. 5 represent individual computers, e.g., S1 and S2 are not done on the same computer in this example. In this way, the architecture can become more than three tiers, expanding to any N>=3 tier structure. Also note that while caches are not indicated in FIG. 5, they can exists before or after any of steps S1, S2, or S3, or they could be viewed as existing along any arrow. As illustrated in FIG. 5, client A is a thicker client 106 with appropriate functionality, while client B is somewhat thinner, and client C is a thin client 106 such as a handheld computing device. Two paths are shown to client C: one where S2 and S3 are performed on the same machine and one where they are performed on separate machines. Further, S1, S2, and S3 only need to be written once and merely instanced on each of the different machines. Another type of client 106 diversity supportable here would be to add client D that wants to add an extra step S4 to the output of S3. Just because it achieves a different result, does not prevent it from using the previously done work of S1–S3.

Figure 6:
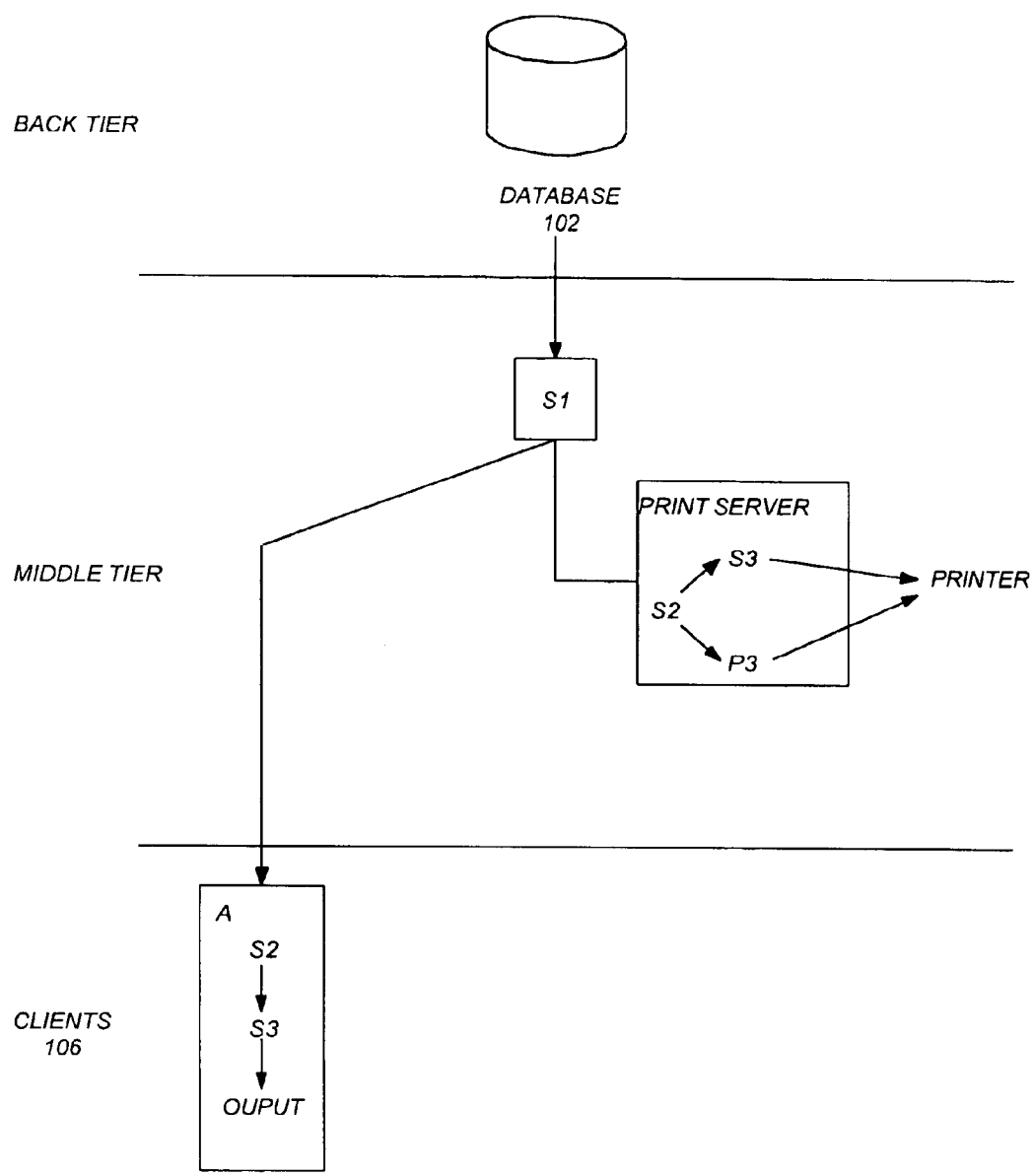
FIG. 6 illustrates a diagram of an example implementation in accordance with one or more embodiments of the invention.

The second problem example described above was for a thick client 106 (e.g., thick client A of FIG. 5) to plot its view to a print server in the middle tier with the desire to have the plot output retain the fidelity of the conversion from door object to graphics (S2) performed on the client 106 without needing to pass all of those primitives back up to the middle server tier 104. The third step of turning the primitives into the final bitmap/image will probably vary from the demands of a dumb video frame buffer and an intelligent printer, so there may be an alternative step P3 that stylizes those primitives out to a printer, or the printer might still want the simple bitmap output of S3. FIG. 6 illustrates the diagram of the solution to this problem in accordance with one or more embodiments of the invention. In FIG. 6, S2 and S3 only need to be written once, and caching can occur along any arrow.

The last problem example described above provided for splitting multiple data types and merging them together. The solution in accordance with embodiments of the invention is to break up the process into smaller steps. Such steps may comprise: the contour 1 stylizing the height data, contour 2 stylizing the contour lines as pixels on an output device, triangle 1 stylizing the height data as triangle meshes, triangle 2 stylizing the textured triangle mesh as pixels on an output device, satellite T stylizing the satellite image and triangle mesh into a texture mapped mesh, and contour T stylizing the contour lines and triangle mesh into a texture mapped mesh.

Figure 7:
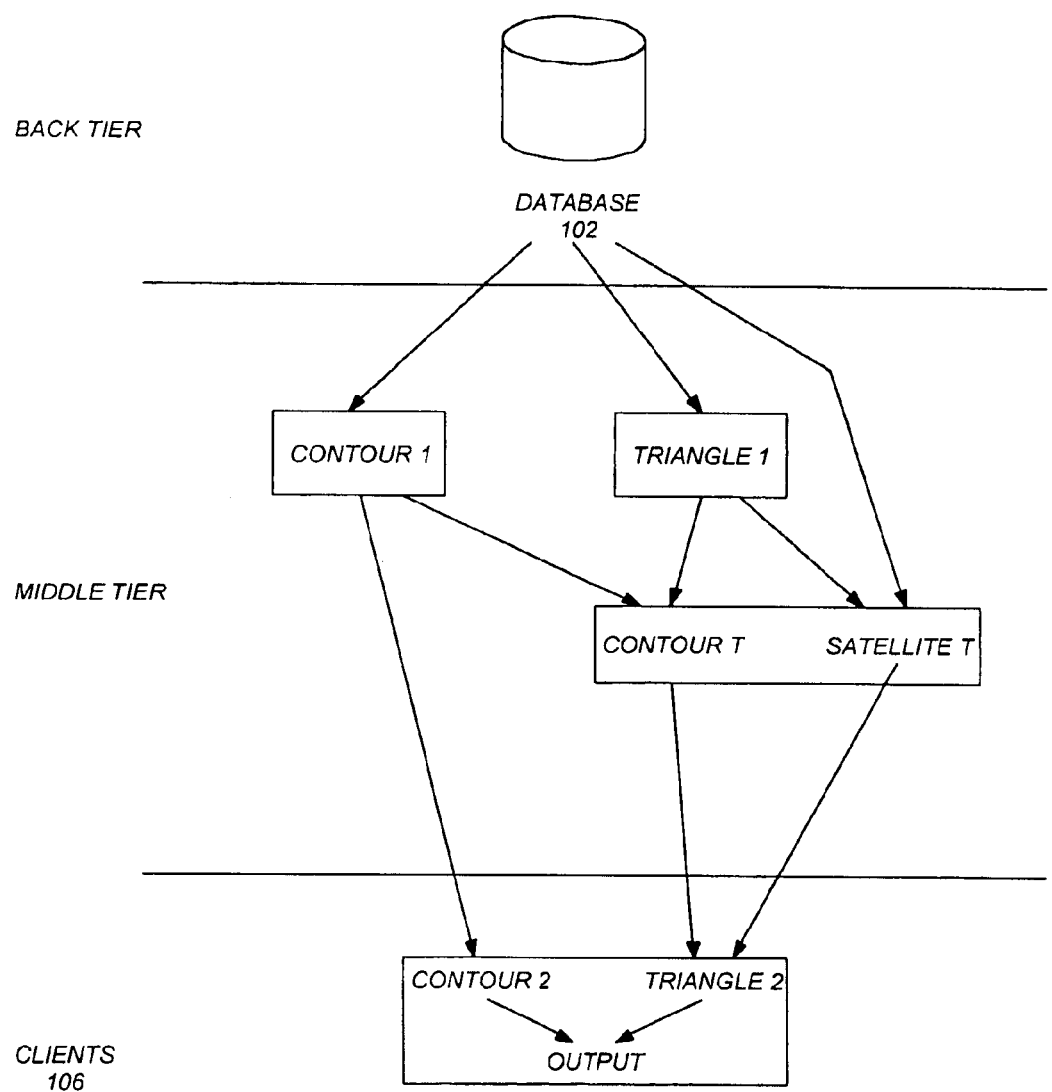
FIG. 7 illustrates a diagram of an example implementation in accordance with one or more embodiments of the invention.

FIG. 7 illustrates this process in accordance with one or more embodiments of the invention. Again, caching can occur along any arrow. While Contour T and Satellite T are illustrated on the same machine, they may also be on different machines. Further, the stylizers on the middle tier could be in any combination of one to four machines or even more machines if it is desirable to spread the load for many clients 106 across several middle tier machines.

CONCLUSION

This concludes the description of the preferred embodiment of the invention. The following describes some alternative embodiments for accomplishing the present invention. For example, any type of computer, such as a mainframe, minicomputer, personal computer, or hand held computing device, or computer configuration, such as a timesharing mainframe, local area network, or standalone personal computer, could be used with the present invention. Alternative embodiments may or may not provide for the registration of objects or the object and class structure as described. Additionally, data and/or objects may or may not be cached depending on the implementation.

In summary, embodiments of the invention provide for stylizing data into a visually perceptible presentation. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method for stylizing data comprising:
   obtaining a domain abject comprising an object representation of data stored in a database for a domain entity;
   a first portable stylization process stylizing the data of the domain object into an application object comprising an object representation of the data in the domain object that is relevant for a particular computer application; and
   a second portable stylization process stylizing the data of the application object into a presentation object comprising an object representation that encapsulates a visual appearance of the data in the application object;
   providing the presentation object for viewing the data in the encapsulated visual appearance.

2. The method of claim 1 wherein the domain object contains all information about the domain entity that the domain object represents.

3. The method of claim 1 further comprising a stylization agent object stylizing the application object for the domain object based on a stylization context, wherein the stylization context identifies only that data relevant for the particular computer application.

4. The method of claim 1 wherein the application object further comprises business logic that provides functionality for the particular application.

5. The method of claim 1 further comprising a stylization agent object stylizing the presentation object from the application object based on a stylization context, wherein the stylization context identifies a visual appearance for the data in the application object.

6. The method of claim 1 further comprising obtaining a stylizer object, wherein the stylizer object comprises:
   a data object selected from a group comprising the domain object and application object;
   stylization context object, wherein the stylization context object comprises a stylization context;
   a stylization agent;
   a mapping of die stylization agent to a paired index of data objects and stylization context objects; and
   a stylize method that invokes an appropriate stylization agent based on the mapping.

7. The method of claim 6 wherein the paired index is a two-dimensional array of stylization agents indexed by a data object class and stylization context.

8. The method of claim 1 further comprising caching the application object.

9. The method of claim 1 further comprising caching the presentation object.

10. The method of claim 1 wherein the domain entity is a mechanical domain entity.

11. The method of claim 1 wherein the domain entity is an architecture, engineering and construction (AEC) domain entity.

12. The method of claim 1 wherein the domain entity is a geographic information system (GIS) domain entity.

13. An apparatus for stylizing data in an object-oriented computer system comprising:
   one or more object-oriented computer systems having a memory and a data storage device coupled thereto;
   a domain object stored in the memory of a first computer system, the domain object comprising an object representation of data stored in a database for a domain entity;
   a first portable stylization process configured to stylize the domain object into an application object, wherein the application object is stored in the memory of a second computer system, the application object comprising an object representation of the data in the domain object that is relevant for a particular computer application; and
   a second portable stylization process configured to stylize the application object into a presentation object, wherein the presentation object is stored in the memory of a third computer system, the presentation object comprising an object representation that encapsulates a visual appearance of the data in the application object.

14. The apparatus of claim 13 wherein the domain object contains all information about the domain entity that the domain object represents.

15. The apparatus of claim 13 further comprising a stylization agent object configured to stylize the application object for the domain object based on a stylization context, wherein the stylization context identifies only that data relevant for the particular computer application.

16. The apparatus of claim 13 wherein the application object further comprises business logic that provides functionality for the particular application.

17. The apparatus of claim 13 further comprising a stylization agent object configured to stylize the presentation object for an application object based on a stylization context, wherein the stylization context identifies a visual appearance for the data in the application object.

18. The apparatus of claim 17 further comprising a stylizer object, wherein the stylizer object comprises:
   a domain object selected from a group comprising the domain object and application object;
   a stylization context object, wherein the stylization context object comprises a stylization context;
   a stylization agent;
   a mapping of the stylization agent to a paired index of data objects and stylization context objects; and
   a stylize method that invokes an appropriate stylization agent based on the mapping.

19. The apparatus of claim 18 wherein the paired index is a two-dimensional array of stylization agents indexed by a data object class and stylization context.

20. The apparatus of claim 13 wherein the application object is stored in a cache of the second computer system.

21. The apparatus of claim 13 wherein the presentation object is stored in a cache of the third computer system.

22. The apparatus of claim 13 wherein the domain entity is a mechanical domain entity.

23. The apparatus of claim 13 wherein the domain entity is an architecture, engineering and construction (AEC) domain entity.

24. The apparatus of claim 13 wherein the domain entity is a geographic information system (GIS) domain entity.

25. An article of manufacture comprising a program storage medium readable by a computer and embodying one or more instructions executable by the computer to perform a method for stylizing data in an object-oriented computer system, the method comprising:
   obtaining a domain object comprising an object representation of data stored in a database for a domain entity;
   stylizing the data in the domain object by obtaining an application object comprising an object representation of the data in the domain object that is relevant for a particular computer application; and
   stylizing the data in the application object by obtaining a presentation object comprising an object representation that encapsulates a visual appearance of the data in the application object.

26. The article of manufacture of claim 25 wherein the domain object contains all information about the domain entity that the domain object represents.

27. The article of manufacture of claim 25 wherein a stylization agent object obtains the application object for the domain object, wherein the stylization context identifies contains only that data relevant for the particular computer application.

28. The article of manufacture of claim 25 wherein the application object further comprises business logic that provides functionality for the particular application.

29. The article of manufacture of claim 25 wherein a stylization agent object obtains the presentation object for the application object based on a stylization context, wherein the stylization context identifies a visual appearance for the data in the application object.

30. The article of manufacture of claim 29, the method further comprising obtaining a stylizer object, wherein the stylizer object comprises:
   a domain object selected from a group comprising the domain object and application object;
   a stylization context object, wherein the stylization context object comprises a stylization context;
   a stylization agent;
   a mapping of the stylization agent to a paired index of data objects and stylization context objects; and
   a stylize method that invokes an appropriate stylization agent based on the mapping.

31. The article of manufacture of claim 30 wherein the paired index is a two-dimensional array of stylization agents indexed by a data object class and stylization context.

32. The article of manufacture of claim 25, the method further comprising caching the application object.

33. The article of manufacture of claim 25, the method further comprising caching the presentation object.

34. The article of manufacture of claim 25 wherein the domain entity is a mechanical domain entity.

35. The article of manufacture of claim 25 wherein the domain entity is an architecture, engineering and construction (ABC) domain entity.

36. The article of manufacture of claim 25 wherein the domain entity is a geographic information system (GIS) domain entity.

* * * * *

UNITED STATES PATENT AND TRADEMARK OFFICE
CERTIFICATE OF CORRECTION

PATENT NO. : 6,925,473 B2
DATED : August 22, 2005
INVENTOR(S) : Daniel Lee Thompson et al.

It is certified that error appears in the above-identified patent and that said Letters Patent is hereby corrected as shown below:

Column 13,
Line 58, "abject" should read -- object --.

Column 14,
Line 28, "die" should read -- the --.

Signed and Sealed this

Twenty-fifth Day of October, 2005

JON W. DUDAS
*Director of the United States Patent and Trademark Office*